(12) United States Patent
Kotra et al.

(10) Patent No.: US 11,284,086 B2
(45) Date of Patent: Mar. 22, 2022

(54) DECODER SIDE INTRA MODE DERIVATION (DIMD) TOOL COMPUTATIONAL COMPLEXITY REDUCTION

(71) Applicant: Huawei Technologies Co., Ltd., Shenzhen (CN)

(72) Inventors: Anand Meher Kotra, Munich (DE); Zhijie Zhao, Munich (DE); Semih Esenlik, Munich (DE); Han Gao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/734,040

(22) Filed: Jan. 3, 2020

(65) Prior Publication Data

US 2020/0145668 A1 May 7, 2020

Related U.S. Application Data

(63) Continuation of application No. PCT/EP2017/066685, filed on Jul. 4, 2017.

(51) Int. Cl.
*H04N 19/159* (2014.01)
*H04N 19/172* (2014.01)
*H04N 19/176* (2014.01)
*H04N 19/124* (2014.01)

(52) U.S. Cl.
CPC ......... *H04N 19/159* (2014.11); *H04N 19/124* (2014.11); *H04N 19/172* (2014.11); *H04N 19/176* (2014.11)

(58) Field of Classification Search
CPC ..... H04N 19/159; H04N 19/119; H04N 19/11
See application file for complete search history.

(56) References Cited

U.S. PATENT DOCUMENTS

| | | | |
|---|---|---|---|
| 2012/0106640 A1 | 5/2012 | Shen et al. | |
| 2014/0092964 A1* | 4/2014 | Ugur | H04N 19/593 375/240.12 |
| 2014/0161182 A1 | 6/2014 | Moriyoshi | |
| 2016/0165248 A1 | 6/2016 | Lainema et al. | |
| 2016/0227244 A1* | 8/2016 | Rosewarne | H04N 19/463 |
| 2017/0171563 A1 | 6/2017 | Deshpande | |
| 2017/0353730 A1* | 12/2017 | Liu | H04N 19/105 |

(Continued)

OTHER PUBLICATIONS

Lin et al., "Intra coding improvements for slice boundary blocks," Joint Collaborative Team on Video Coding (JCT-VC) of ITU-T SG16 WP3 and ISO/IEC JTC1/SC29/WG11, Daegu, KR, JCTVC-D302, m19068, pp. 1-4, International Telecommunication Union, Geneva, Switzerland (Jan. 20-28, 2011).

(Continued)

*Primary Examiner* — Boubacar Abdou Tchoussou
(74) *Attorney, Agent, or Firm* — Leydig, Voit & Mayer, Ltd,

(57) ABSTRACT

The present disclosure relates to image encoding/decoding applying decoder side intra-prediction mode determination (DIMD). In order to reduce the computational complexity, DIMD for a current coding block based on a template of a neighboring reconstructed coding block is not performed if the border between the current and the reconstructed coding block concurs with a border between coding tree blocks.

15 Claims, 11 Drawing Sheets

(56) References Cited

U.S. PATENT DOCUMENTS

| | | | | |
|---|---|---|---|---|
| 2019/0082184 A1* | 3/2019 | Hannuksela | | H04N 19/70 |
| 2019/0166370 A1* | 5/2019 | Xiu | | H04N 19/176 |
| 2019/0215521 A1* | 7/2019 | Chuang | | H04N 19/105 |
| 2019/0373252 A1* | 12/2019 | Moon | | H04N 19/119 |
| 2019/0379891 A1* | 12/2019 | Moon | | H04N 19/11 |
| 2020/0204824 A1* | 6/2020 | Lai | | H04N 19/126 |

OTHER PUBLICATIONS

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).

Chen et al., "Algorithm description of Joint Exploration Test Model 5 (JEM5)," ISO/IEC JTC1/SC29/WG11/N16698, Joint Video Exploration Team (JVET) of ITU-T SG16 WP3 and ISO/IEC JTC1/SC29/WG11, Geneva, Switzerland, JVET-E1001V2, pp. 1-44, International Telecommunication Union, Geneva, Switzerland (Jan. 12-20, 2017).

Xiu et al., "Decoder-side intra mode derivation," Joint Video Exploration Team (JVET) of ITU-T SG 16WP3 and ISO/IEC JTC1/SC29/WG11, Geneva, CH, JVET-C0061, pp. 1-6, International Telecommunication Union, Geneva, Switzerland (May 26-Jun. 1, 2016).

Xiu et al., "EE8-related: Decoupling decoder-side intra mode derivation from entropy decoding," Joint Video Exploration Team (JVET) of ITU-T SG16 WP3 and ISO/IEC JTC1/SC29/WG11, Chengdu, CN, JVET-D0098, pp. 1-4, International Telecommunication Union, Geneva, Switzerland (Oct. 15-21, 2016).

Sze et al., "High Efficiency Video Coding (HEVC) Algorithms and Architectures," Integrated Circuits and Systems, pp. 1-384, Springer Publishing, New York, New York (2014).

Xiu et al.,"EE8: Decoder-side intra mode derivation," Joint Video Exploration Team (JVET) of ITU-T SG16 WP3 and ISO/IEC JTC1/SC29/WG11, Chengdu, CN, JVET-D0097-r3, pp. 1-4, International Telecommunication Union, Geneva, Switzerland (Oct. 15-21, 2016).

"Series H: Audiovisual and Multimedia Systems, Infrastructure of audiovisual services—Coding of moving video; Advanced video coding for generic audiovisual services," ITU-T H.264, pp. 1-812, International Telecommunication Union, Geneva, Switzerland (Apr. 2017).

"Series H: Audiovisual and Multimedia Systems Infrastructure of audiovisual services—Coding of moving video; High efficiency video coding," ITU-T H.265, pp. 1-664, International Telecommunication Union, Geneva, Switzerland (Dec. 2016).

\* cited by examiner

| | Random Access Main 10 (**Template_size == 1)<br>Anchor : JEM 5.0.1 + Original DIMD<br>Tested : JEM 5.0.1 + DIMD with reduced computational complexity | | | | | |
|---|---|---|---|---|---|---|
| | | | | Over | | |
| | Y | U | V | EncT | DecT | |
| BuildingHall | -0.02% | 0.06% | 0.03% | 99% | 100% | |
| CampfireParty | 0.01% | 0.03% | -0.05% | 100% | 98% | |
| CatRobot | -0.02% | 0.10% | 0.07% | 101% | 96% | |
| Crosswalk | -0.05% | -0.15% | 0.09% | 100% | 95% | |
| DaylightRoad | -0.12% | 0.01% | -0.08% | 101% | 97% | |
| FoodMarket | 0.12% | -0.01% | 0.15% | 103% | 96% | |
| ParkRunning | 0.04% | 0.08% | 0.18% | 102% | 95% | |
| Tango | 0.02% | 0.45% | 0.10% | 100% | 98% | |
| RitualDance | 0.02% | 0.01% | 0.08% | 102% | 96% | |
| Timelapse | -0.27% | 1.13% | 0.43% | 101% | 97% | |
| Catctus | 0.07% | 0.60% | 0.63% | 101% | 94% | |
| BasketballDrive | 0.02% | 0.28% | 0.18% | 101% | 92% | |
| BQTerrace | -0.04% | -0.17% | -0.02% | 102% | 93% | |
| Class 4K | 0.00% | 0.07% | 0.06% | 101% | 97% | |
| Class HD | -0.04% | 0.37% | 0.26% | 101% | 94% | |
| Overall(4K+HD) | -0.02% | 0.19% | 0.14% | 101% | 96% | |

Fig. 9

| | Random Access Main 10 (**Template_Size (L) == 1) Anchor: (HEM1.0 + BIO) + Original DIMD Tested: (HEM1.0 + BIO) + DIMD with reduced computational complexity | | | | |
|---|---|---|---|---|---|
| | Over | | | | DecT (not completely reliable) |
| | Y | U | V | EncT | |
| BuildingHall | 0.03% | -0.04% | 0.21% | 103% | 103% |
| CampfireParty | 0.02% | 0.05% | 0.02% | 105% | 105% |
| CatRobot | 0.04% | 0.31% | -0.01% | 104% | 105% |
| Crosswalk | -0.07% | 0.04% | -0.27% | 109% | 110% |
| DaylightRoad | 0.04% | -0.03% | 0.10% | 103% | 104% |
| FoodMarket | 0.06% | 0.24% | 0.28% | 107% | 108% |
| ParkRunning | -0.02% | -0.02% | 0.03% | 102% | 106% |
| Tango | 0.00% | -0.06% | 0.02% | 101% | 105% |
| RitualDance | -0.02% | 0.33% | -0.35% | 101% | 100% |
| Timelapse | 0.10% | -5.16% | 1.69% | 97% | 98% |
| Catctus | 0.03% | 0.04% | 0.61% | 107% | 109% |
| BasketballDrive | 0.03% | 0.00% | -0.01% | 105% | 104% |
| BQTerrace | -0.04% | 0.25% | -0.57% | 99% | 99% |
| Class 4K | 0.01% | 0.06% | 0.05% | 104% | 106% |
| Class HD | 0.02% | -0.91% | 0.27% | 102% | 102% |
| Overall(4K+HD) | 0.02% | -0.31% | 0.13% | 103% | 104% |

Fig. 10

| | Random Access Main 10 (** Template_Size (L) == 3) Anchor : (HEM1.0 + BIO) + Original DIMD Tested : (HEM1.0 + BIO) + DIMD with reduced computational complexity | | | | |
|---|---|---|---|---|---|
| | Over | | | EncT | DecT (not completely reliable) |
| | Y | U | V | | |
| BuildingHall | -0.01% | -0.14% | -0.31% | 105% | 102% |
| CampfireParty | -0.01% | 0.02% | 0.10% | 108% | 102% |
| CatRobot | 0.02% | 0.06% | -0.04% | 100% | 103% |
| Crosswalk | 0.15% | 0.30% | 0.25% | 98% | 103% |
| DaylightRoad | 0.04% | 0.17% | -0.13% | 102% | 102% |
| FoodMarket | -0.02% | -0.33% | -0.08% | 107% | 103% |
| ParkRunning | 0.07% | -0.09% | -0.22% | 103% | 103% |
| Tango | 0.06% | -0.04% | 0.08% | 104% | 104% |
| RitualDance | 0.03% | 0.21% | 0.29% | 103% | 103% |
| Timelapse | -0.18% | -0.60% | -2.16% | 103% | 104% |
| Catctus | 0.01% | -0.17% | -0.04% | 108% | 104% |
| BasketballDrive | 0.04% | -0.07% | 0.47% | 104% | 105% |
| BQTerrace | -0.03% | 0.10% | 0.30% | 97% | 106% |
| Class 4K | 0.04% | -0.01% | -0.04% | 103% | 103% |
| Class HD | -0.03% | -0.10% | -0.23% | 103% | 104% |
| Overall(4K+HD) | 0.01% | -0.05% | -0.12% | 103% | 103% |

Fig. 11

DECODER SIDE INTRA MODE DERIVATION (DIMD) TOOL COMPUTATIONAL COMPLEXITY REDUCTION

CROSS-REFERENCE TO RELATED APPLICATIONS

This application is a continuation of International Application No. PCT/EP2017/066685, filed on Jul. 4, 2017, the disclosure of which is hereby incorporated by reference in its entirety.

TECHNICAL FIELD

The present disclosure relates to the field of computer vision, in particular to the topic normally referred to as video processing and video coding.

BACKGROUND

Current block-based hybrid video codecs employ predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed (e.g., by means of quantization) and further compacted (e.g., by entropy coding) to form a bitstream. The bitstream can further include any signaling information which enables the decoder to decode the encoded video. For instance, the signaling may include settings concerning the encoder settings such as size of the input picture, frame rate, quantization step indication, prediction applied to the blocks of the pictures, or the like.

The differences between a block and its prediction are known as the residual of the block. More specifically, each pixel of the block has a residual, which is the difference between an intensity level of that pixel and its predicted intensity level. The intensity level of a pixel is referred to as the pixel value or value of the pixel. The residuals of all the pixels of a block are referred to collectively as the residual of the block. In other words, the block has a residual which is a set or matrix consisting of the residuals of all the pixels of the block. The term pixel denotes a sample of an image. This may be a sample in one color component (such as red, green, blue, white) or in luminance and/or one or more chrominance components or merely a brightness value of a gray-scale image.

Spatial prediction exploits spatial redundancy in natural or computer-generated images. It may be employed in still image or video image (moving picture) compression. Since the spatial prediction uses for predicting of a current block only pixels within the same image or video frame, it is often referred to as intra-prediction. This is in contrast to the inter-prediction which exploits temporal redundancy of the video images and uses for prediction of a current block pixels from other images.

Intra-prediction computes predictor of a current block based on already processed (reconstructed) blocks adjacent to the current block. Usually, pixels of the adjacent blocks which are located closest to the current block (typically pixels of the adjacent blocks adjacent to the current block, i.e. located at the boundary to the current block) are used as reference pixels to predict the current block.

In H.265/HEVC (High-Efficiency Video Coding) standard, The HEVC intra prediction methods can be classified in two categories, angular (directional) and planar. Angular prediction methods provide the codec with a possibility to accurately model structures with directional edges since they extrapolate the reference pixels in a certain direction in order to enable continuing of edges which cross the boundary between the reference pixels and the current block. Directions used in HEVC are illustrated in FIG. 3A.

The planar prediction methods include DC prediction and planar predictors estimating smooth image content. In the case of DC prediction, the predicted sample values are populated with a constant value representing the average of the reference samples immediately left and to the above of the block to be predicted. On the other hand, planar predictor has the capability to generate a prediction surface without discontinuities on the block boundaries. This is achieved by averaging a horizontal and vertical linear prediction on sample basis based on the distance of the predicted sample from the reference pixels.

As the reconstruction is performed at transform block granularity, also the intra prediction is operated at the selected transform block size ranging from 4×4 to 32×32 samples each of which supports 33 distinct prediction directions. A decoder must thus support 132 combinations of block size and prediction direction.

There are also different filtering alternatives for pre-processing the reference samples prior to applying those in the actual intra prediction process. Similarly, some of the prediction modes include a post-processing step to refine the sample surface continuity on the block boundaries.

Further details of the intra-prediction in HEVC can be found in V. Sze et al (Ed.), High Efficiency Video Coding (HEVC): Algorithms and Architectures, Springer, 2014, Chapter 4, incorporated herein by reference. In particular, Section 4.3.1.2 clarifies that reference pixels for a current block may be extended to include further pixels in the same line (row or column) as reference pixels of the adjacent block. This is illustrated in FIG. 3B (from Sze et al.), in which left reference samples are projected to extend the top reference row. The bold arrow represents the prediction direction, the thin arrows where the reference sample projections in the case of intra mode 23.

The prediction is applied to coding blocks (CUs), also referred to as coding blocks (CBs) which may have different sizes. In particular, in HEVC, the image or slice (individually decodable portion of the image) is subdivided into code tree units (CTUs), also referred to as coding tree blocks (CTBs), which have the same predefined or signaled (within the bitstream) size. Each CTU may be further hierarchically split by quad-tree partitioning or binary tree partitioning as described, for instance, in Chapter 3.2 of the book by Sze et al referred to above.

The intra-prediction is more accurate if there are more angular directions, especially for larger block sizes. On the other hand, more directions requires also more signaling overhead for including the selected direction (intra-prediction mode) into the bitstream.

In order to provide a tradeoff between the accuracy and signaling overhead, decoder-side intra-mode determination (DIMD) tool has been developed.

In order to provide a tradeoff between the accuracy and signaling overhead, decoder-side intra-mode determination (DIMD) tool has been developed. The DIMD tool derives the intra mode by matching a template with candidate predictors of different intra modes and selecting the intra mode with the best match. A template is an area of pixels in an already reconstructed adjacent block. The candidate predictors are generated from a reference line neighbor to the template area. Matching is performed by calculating a similarity metric such as the sum of absolute differences (SAD) between the template samples and the candidate predictor samples. The intra mode which results in the minimum SAD is chosen as the final derived intra mode.

Details on DIMD can be found in JVET-D0097, "EE8: Decoder-side intra mode derivation" by Xiaoyu Xiu et al., 4$^{th}$ meeting of ITU-T SG 16 WP 3 and ISO/IEC JTC 1/SC 29/WG 11 on 15-21 Oct. 2016, incorporated herein by reference. US 20120106640 A1 also shows decoding side intra prediction derivation for video coding.

The Joint Exploration Model (JEM) describes the features that are under coordinated test model study by the Joint Video Exploration Team (JVET) of ITU-T VCEG and ISO/IEC MPEG as potential enhanced video coding technology beyond the capabilities of HEVC.

The number of intra modes are increased from 36 to 67 starting from version JEM 3.0 onwards. This increase of intra mode results in a disadvantage of significant amount of signalling overhead since the intra mode needs to be derived at the encoder and signaled to the decoder. To solve this problem decoder side intra mode (DIMD) tool was proposed.

SUMMARY

DIMD adds additional complexity at both the encoder and decoder as the different intra modes have to be tested for deriving the optimal intra mode for the target block. For each intra mode the similarity between the template of samples and predictors obtained from the reference line by different intra-modes needs to be computed which is computationally complex. The template comprises reconstructed pixels from the neighboring blocks. The more pixels from the reconstructed blocks are used, the more accurate the intra-mode estimation can be performed and the more accurate will likely be the intra-prediction, which on the other hand leads to a more efficient coding.

Moreover, template matching may require more frequent access to line memory in which the previously reconstructed pixels may be stored, which causes further overhead n terms of access operations and time especially if the line memory is an off-chip memory.

Embodiments of the present disclosure increase the efficiency of the intra prediction by disabling of a part of the template or the entire template matching especially on coding tree block boundaries.

According to an aspect of the present invention, an apparatus for intra-predicting coding blocks of an image is provided. The apparatus comprises an intra-prediction mode determining unit configured to determine an intra-prediction mode for a current coding block based on pixels of a first reconstructed coding block and/or a second reconstructed coding block. The first and the second reconstructed coding block are adjacent to the current coding block in respectively different directions among a vertical direction and a horizontal direction. The apparatus further comprises an intra-prediction control unit configured to deactivate determination of the intra-prediction mode based on the pixels of the first reconstructed coding block if the border between the current coding block and first reconstructed coding block concurs with a border between adjacent coding tree blocks.

An advantage of this aspect is that by disabling the part of the template corresponding to one of the neighboring blocks or by disabling the DIMD entirely, fewer computations need to be performed, and thus the complexity can be reduced, especially on the CTU border.

For instance, the intra-prediction control unit is configured to deactivate the determination of the intra-prediction mode based on the pixels of the first reconstructed coding block, only in case the border between the current coding block and first reconstructed coding block concurs with a border between adjacent coding tree blocks.

An advantage is that the memory access to samples belonging to another coding tree block than the current coding block is reduced. This is particularly beneficent if the samples of the other coding tree block, e.g. the top neighbor, are stored in a line buffer and there could be variance with the memory access cycles to the line buffer.

For example, the first reconstructed coding block is adjacent to the current coding block in top direction, and the second reconstructed coding block is adjacent to the current coding block in left direction.

As an example, the intra-prediction control unit is configured to deactivate determination of the intra-prediction mode based on the pixels of the first as well as the second reconstructed coding block only if the border between the current coding block and first reconstructed coding block concurs with a border between adjacent coding tree blocks.

As another example, the intra-prediction mode determination unit is configured to determine the intra-prediction mode for the current coding block based on the pixels of the second reconstructed coding block when the determination of the intra-prediction mode based on the pixels of the first coding block is deactivated.

An advantage is while computational complexity is reduced, a more comprehensive intra-mode determination is performed when the samples a neighboring coding block are more easily accessible.

For instance, the length of the current coding block in one of the horizontal and vertical directions is larger than the length of the current coding block in the other one of the horizontal and vertical direction.

For example, the intra prediction control unit is further configured to disable an intra-prediction mode which uses a pixel of an unavailable coding block.

This provides the advantage that in addition to reducing the computational complexity, the effect of artificial reference samples on the intra-mode determination is reduced as well.

In an exemplary embodiment, an image encoding device comprises the apparatus for intra-predicting coding blocks of an image and an encoding unit configured to encode the image to generate a bitstream.

For instance, the encoding unit is configured to include into the bitstream an indicator indicating whether or not intra-prediction mode determination is to be performed for one or more coding blocks but configured not to include, in the bitstream, said indicator for the current coding block if the second reconstructed coding block is not available for the current coding block.

The second reconstructed coding block is not available e.g. for coding blocks at an image border (for example, the left border). For these coding blocks, no DIMD is performed. Accordingly, the DIMD flag can be inferred to be 0 (indicating "no DIMD") at the decoder. Thus, as an advantage, the flag does not need to be signaled by the encoder, and the signaling overhead is reduced.

In another exemplary embodiment, an image decoding device comprises the apparatus for intra-predicting coding blocks of an image and a decoding unit configured to decode the image from a bitstream.

For instance, the decoding unit is further configured to determine that intra-prediction mode determination is not to be performed for the current coding block if the second reconstructed coding block is not available for the current coding block.

According to another aspect, a method for intra-predicting coding blocks of an image is provided. The method comprises a step of determining an intra-prediction mode for a current coding block based on pixels of a first reconstructed coding block and/or a second reconstructed coding block. The first and the second reconstructed coding block are adjacent to the current coding block in respectively different directions among a vertical direction and a horizontal direction. The method further comprises a step of deactivating determination of the intra-prediction mode based on the pixels of the first reconstructed coding block if the border between the current coding block and first reconstructed coding block concurs with a border between adjacent coding tree blocks.

For instance, in the step of deactivating, the determination of the intra-prediction mode based on the pixels of the first reconstructed coding block is deactivated, only if the border between the current coding block and first reconstructed coding block concurs with a border between adjacent coding tree blocks.

For example, the first reconstructed coding block is adjacent to the current coding block in top direction, and the second reconstructed coding block is adjacent to the current coding block in left direction.

As an example, in the step of deactivating, the determination of the intra-prediction mode based on the pixels of the first as well as the second reconstructed coding block is deactivated only if the border between the current coding block and first reconstructed coding block concurs with a border between adjacent coding tree blocks.

As another example, in the step of determining an intra-prediction mode, the intra-prediction mode is determined for the current coding block based on the pixels of the second reconstructed coding block when the determination of the intra-prediction mode based on the pixels of the first coding block is deactivated.

For instance, the length of the current coding block in one of the horizontal and vertical directions is larger than the length of the current coding block in the other one of the horizontal and vertical direction.

For example, the method for intra-predicting coding blocks of an image further comprises a step of disabling an intra-prediction mode which uses a pixel of an unavailable coding block.

In an exemplary embodiment, an image encoding method comprises the method steps for intra-predicting coding blocks of an image. The method further comprises a step of encoding the image to generate a bitstream.

For instance, the step of encoding comprises including into the bitstream an indicator indicating whether or not intra-prediction mode determination is to be performed for one or more coding blocks but not including, in the bitstream, said indicator for the current coding block if the second reconstructed coding block is not available for the current coding block.

In another exemplary embodiment, an image decoding method comprises the step of decoding an image from a bitstream, and the method steps for intra-predicting coding blocks of the image.

For instance, the image decoding method comprises determining that intra-prediction mode determination is not to be performed for the current coding block if the second reconstructed coding block is not available for the current coding block.

Furthermore, a computer readable medium storing program instructions which, when executed, cause a computer to perform the method steps for intra-predicting coding blocks of an image.

BRIEF DESCRIPTION OF DRAWINGS

In the following exemplary embodiments are described in more detail with reference to the attached figures and drawings, in which:

FIGS. 9 to 11 are tables of test results.

DETAILED DESCRIPTION

Embodiments of the present disclosure relate to an efficient intra-prediction of coding blocks of an image and is particularly advantageous for reducing the computational complexity of decoder side intra mode derivation (DIMD). The processing of coding blocks may be employed in intra prediction during encoding and decoding of video. In the following, an exemplary encoder and decoder which may implement the processing of coding blocks of the present disclosure are described.

Figure 1:
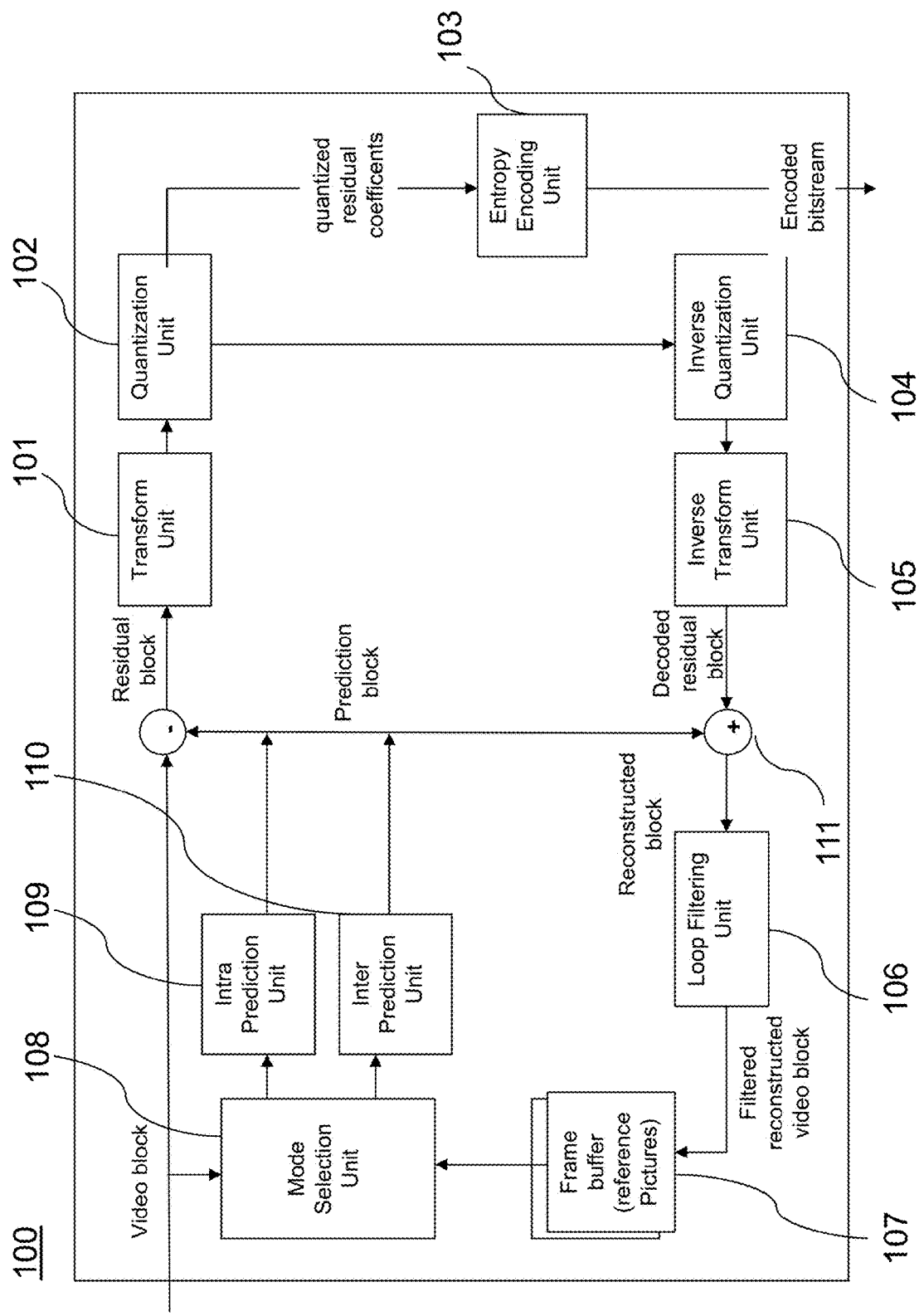
FIG. 1 is a block diagram showing an exemplary structure of a video encoder.

FIG. 1 shows an encoder 100 which comprises an input for receiving input blocks of frames or pictures of a video stream and an output for providing an encoded video bitstream. The term "frame" in this disclosure is used as a synonym for picture. However, it is noted that the present disclosure is also applicable to fields in case interlacing is applied. In general, a picture includes m times n pixels. These correspond to image samples and may each comprise one or more color components. For the sake of simplicity, the following description refers to pixels meaning samples of luminance. However, it is noted that the intra-prediction of coding blocks of the disclosure can be applied to any color component including chrominance or components of a color space such as RGB or the like. On the other hand, it may be beneficial to determine an intra-prediction mode only for only one component and to apply the determined intra-prediction mode to more (or all) components.

The input blocks to be coded do not necessarily have the same size. One picture may include blocks of different sizes and the block rasters of different pictures may also differ.

The encoder 100 is configured to apply prediction, transformation, quantization, and entropy coding to the video stream. The transformation, quantization, and entropy coding are carried out respectively by a transform unit 101, a quantization unit 102 and an entropy encoding unit 103 so as to generate as an output the encoded video bitstream.

The video stream may include a plurality of frames. Each frame is divided into blocks that are either intra or inter coded. The blocks of, for example, the first frame of the video stream are intra coded by means of an intra prediction unit 109. An intra frame is coded using information from that frame only, so that it can be decoded independently from other frames. An intra frame can thus provide an entry point in the bitstream, e.g., for random access. Blocks of other frames of the video stream may be inter coded by means of an inter prediction unit 110: each block of an inter-coded frame is predicted from a block in another frame (reference frame), e.g., a previously coded frame. A mode selection unit 108 is configured to select whether a block of a frame is to be intra predicted or inter predicted, i.e. whether it will be processed by the intra prediction unit 109 or the inter prediction unit 110. The mode selection unit 108 also controls the parameters of intra of inter prediction. In order to enable refreshing of the image information, an inter coded frame may comprise not only inter coded blocks, but also one or more intra coded blocks. Intra frames, in contrast, contain only intra coded and no inter coded blocks. Intra frames may be inserted in the video sequence (e.g., at regularly, that is, each time after a certain number of inter frames) in order to provide entry points for decoding, i.e. points where the decoder can start decoding without using information from preceding frames.

The intra prediction unit 109 is a block prediction unit. For performing spatial or temporal prediction, the coded blocks may be further processed by an inverse quantization unit 104, and an inverse transform unit 105. After reconstruction of the block by a reconstructor 110 a loop filtering unit 106 may be applied to further improve the quality of the decoded image. The reconstructor 110 adds the decoded residuals to the predictor to obtain reconstructed block. The filtered blocks then form the reference frames that are then stored in a frame buffer 107. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding the decoded residual block to the prediction block.

The inter prediction unit 110 receives as an input a block of a current frame or picture to be inter coded and one or several reference frames or pictures from the frame buffer 107. Motion estimation and motion compensation are performed by the inter prediction unit 110. The motion estimation is used to obtain a motion vector and a reference frame, e.g., based on a cost function. The motion compensation then describes a current block of the current frame in terms of the translation of a reference block of the reference frame to the current frame, i.e. by a motion vector. The inter prediction unit 110 selects a prediction block (i.e. a predictor) for the current block from among a set of candidate blocks (i.e. candidate predictors) in the one or several reference frames such that the prediction block minimizes the cost function. In other words, a candidate block for which the cost function is minimum will be used as the prediction block for the current block.

For instance, the cost function may be a measure of a difference between the current block and the candidate block, i.e. a measure of the residual of the current block with respect to the candidate block. For example, the cost function may be a sum of absolute differences (SAD) between all pixels (samples) of the current block and all pixels of the candidate block in the candidate reference picture. However, in general, any similarity metric may be employed, such as mean square error (MSE) or structural similarity metric (SSIM).

However, the cost function may also be the number of bits that are necessary to code such inter-block and/or distortion resulting from such coding. Thus, a rate-distortion optimization procedure may be used to decide on the motion vector selection and/or in general on the encoding parameters such as whether to use inter or intra prediction for a block and with which settings.

The intra prediction unit 109 receives as an input a block of a current frame or picture to be intra coded and one or several reference samples from an already reconstructed area of the current frame. The intra prediction then describes pixels of a current block of the current frame in terms of a function of reference samples of the current frame. The intra prediction unit 109 outputs a prediction block for the current block, wherein said prediction block advantageously minimizes the difference between the current block to be coded and its prediction block, i.e., it minimizes the residual block. The minimization of the residual block can be based, e.g., on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The difference between the current block and its prediction, i.e. the residual block, is then transformed by the transform unit 101. The transform coefficients are quantized by the quantization unit 102 and entropy coded by the entropy encoding unit 103. The thus generated encoded video bitstream comprises intra coded blocks and inter coded blocks and the corresponding signaling (such as the mode indication, indication of the motion vector, and/or intra-prediction direction). The transform unit 101 may apply a linear transformation such as a discrete Fourier transformation (DFT) or a discrete cosine transformation (DCT). Such transformation into the spatial frequency domain provides the advantage that the resulting coefficients have typically higher values in the lower frequencies. Thus, after an effective coefficient scanning (such as zig-zag), and quantization, the resulting sequence of values has typically some larger values at the beginning and ends with a run of zeros. This enables further efficient coding. The quantization unit 102 performs a lossy compression by reducing the resolution of the coefficient values. Entropy coding unit 103 then assigns binary codewords to coefficient values. The codewords are written to a bitstream referred to as the encoded bitstream. The entropy coder also codes the signaling information (not shown in FIG. 1).

Figure 2:
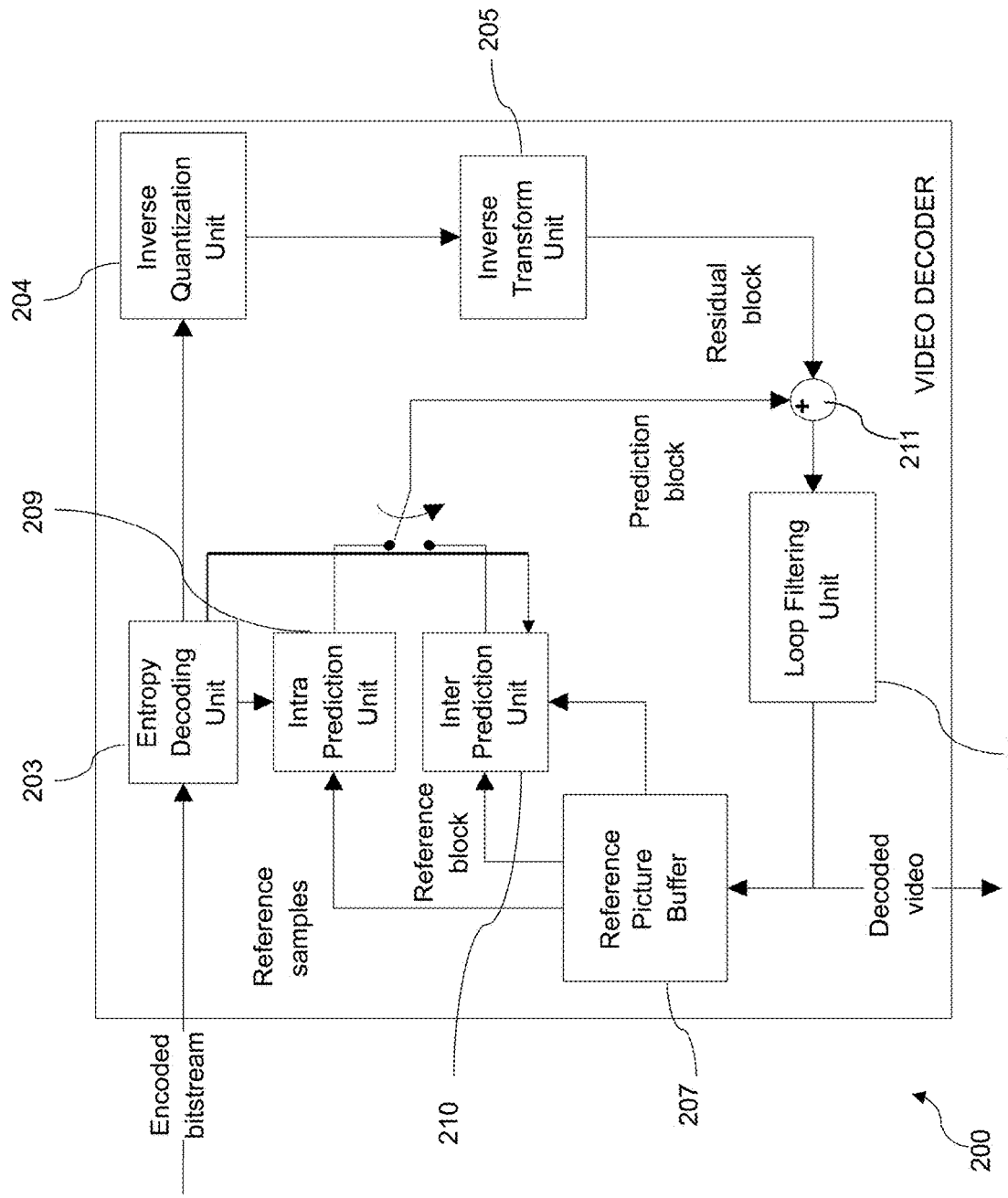
FIG. 2 is a block diagram showing an exemplary structure of a video decoder.

FIG. 2 shows an example of a video decoder 200. The video decoder 200 comprises particularly a reference picture buffer 207 and an intra prediction unit 209, which is a block prediction unit. The reference picture buffer 207 is configured to store at least one reference frame reconstructed from the encoded video bitstream of the encoded video bitstream. The intra prediction unit 209 is configured to generate a prediction block, which is an estimate of the block to be decoded. The intra prediction unit 209 is configured to generate this prediction based on reference samples that are obtained from the reference picture buffer 207.

The decoder 200 is configured to decode the encoded video bitstream generated by the video encoder 100, and preferably both the decoder 200 and the encoder 100 generate identical predictions for the respective block to be encoded/decoded. The features of the reference picture buffer 207 and the intra prediction unit 209 are similar to the features of the reference picture buffer 107 and the intra prediction unit 109 of FIG. 1.

The video decoder 200 comprises further units that are also present in the video encoder 100 like, e.g., an inverse quantization unit 204, an inverse transform unit 205, and a loop filtering unit 206, which respectively correspond to the inverse quantization unit 104, the inverse transform unit 105, and the loop filtering unit 106 of the video coder 100.

An entropy decoding unit 203 is configured to decode the received encoded video bitstream to obtain quantized residual transform coefficients and signaling information. The quantized residual transform coefficients are fed to the inverse quantization unit 204 and an inverse transform unit 205 to generate a residual block. The residual block is added to a prediction block in a reconstructor 211 and the resulting sum is fed to the loop filtering unit 206 to obtain a decoded video block. Frames of the decoded video can be stored in the reference picture buffer 207 and serve as reference frames for inter prediction.

Generally, the intra prediction units 109 and 209 of FIGS. 1 and 2 can use reference samples from an already encoded area to generate prediction signals for blocks that need to be encoded or need to be decoded.

The entropy decoding unit 203 receives as its input the encoded bitstream. The bitstream may first be parsed, i.e. the signaling parameters and the residuals are extracted from the bitstream. The syntax and semantic of the bitstream may be defined by a standard so that the encoders and decoders may work in an interoperable manner. As described in the above Background section, the encoded bitstream includes further information in addition to the prediction residuals.

As discussed above, blocks of a frame can be intra predicted by the intra-prediction unit 109 or 209 of a video encoder 100 or video decoder 200. The prediction is used for intra coding/decoding of the blocks. However, intra coding is not limited to encoding/decoding of video images and thus, the present disclosure may as well be applied in encoding/decoding of still images, since intra-prediction uses only already reconstructed samples of the same image.

As described above, the encoder and decoder process blocks of an image. These blocks are referred to as coding units, CUs or coding blocks, CB. In general, CBs may have different sizes. In the existing codecs, such as H.265/HEVC, before coding, an image is subdivided into coding tree units (CTUs) (also referred to as coding tree blocks, CTBs), which have the same predefined size, for instance, 128×128 samples or 64×64 samples or the like. Each CTB may be further partitioned into CBs which are then coded. The partitioning may be controlled by rate-distortion optimization. Typically, a quad-tree or a binary tree partitioning is applied, splitting a coding block respectively into four or into two equally sized coding blocks, starting from the CTB. The splitting information is then included into the bitstream in order to enable the decoder side to correctly parse the bitstream and, in particular, to recover the CBs coded in the bitstream. Each CTB may be splitted into CUs individually. A CTB may also remain unsplitted.

When applying intra-prediction, a current block is predicted on the basis of the samples of the neighboring (i.e. adjacent) block(s). Accordingly, samples of the already processed neighboring one or more blocks need to be stored in a memory. Apart from the intra-prediction, the samples of previously processed (reconstructed) blocks are also used for deblocking filtering.

Figures 3A, 3B:
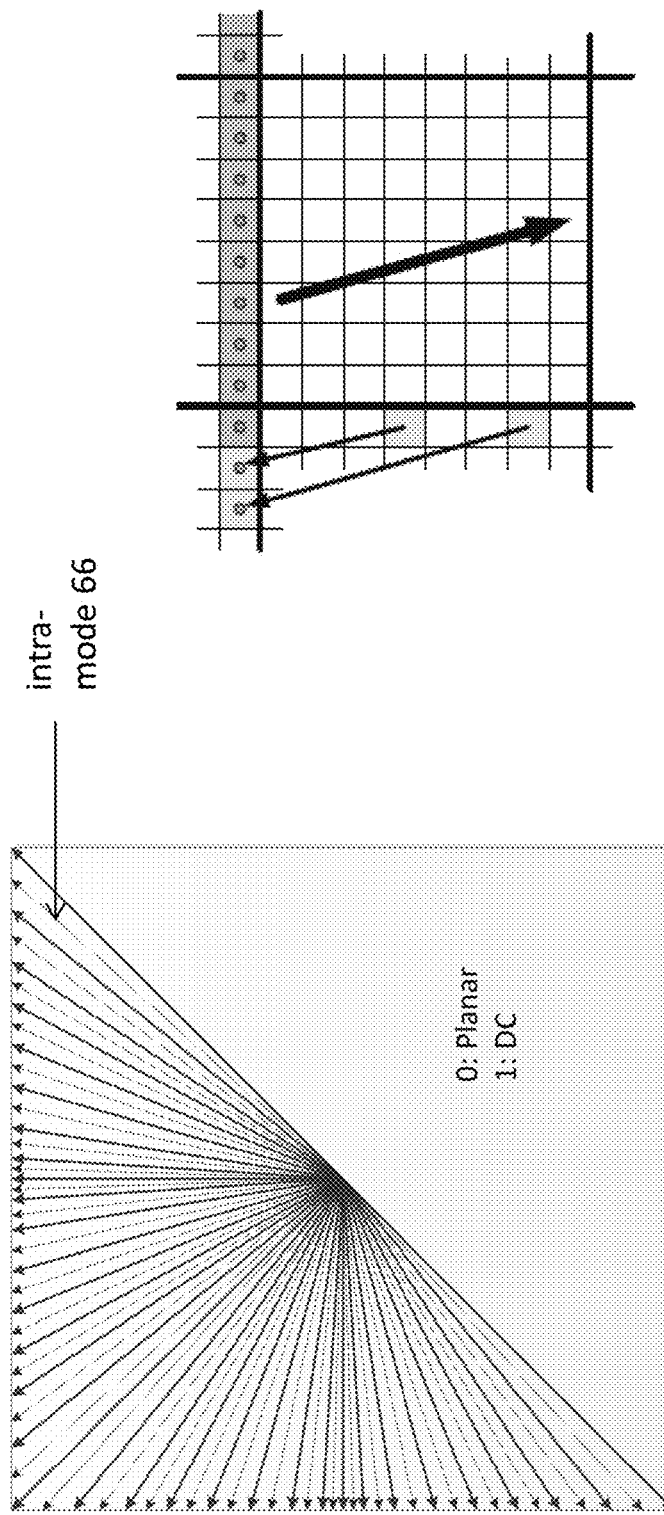
FIG. 3A is a schematic drawing illustrating the possible modes of decoder side intra mode derivation (DIMD).
FIG. 3B is a schematic drawing illustrating example of reference pixel line extension for angular inter-prediction prediction modes.

Recently, the intra prediction has been extended to cover a large number of directions. For instance, FIG. 3A illustrates 65 directional modes corresponding to 65 prediction directions and, in addition, two further modes called DCT mode and planar mode. When the encoder determines a directional mode, it includes the mode into the bitstream so that the decoder may parse it therefrom and apply to obtain the same predictor. With the extended number of modes, the signaling may require additional bits.

In order to avoid such additional signaling, a decoder-based intra-prediction mode determination (DIMD) may be applied. Accordingly, the intra-mode is determined at the encoder side and at the decoder side based on the same information and in the same way, so that no signaling of the intra-mode is necessary.

Figure 4:
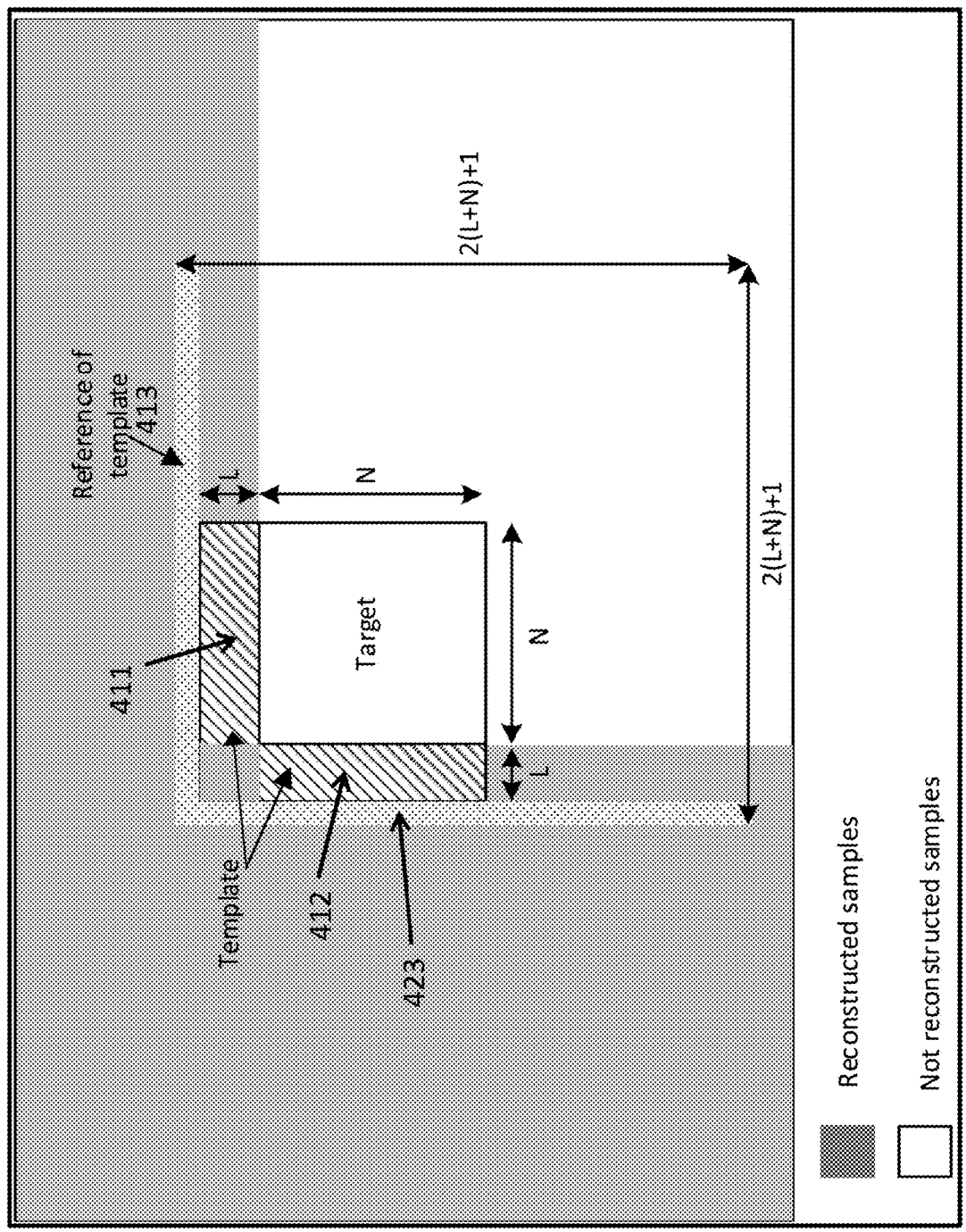
FIG. 4 is a schematic drawing illustrating the borders of a current coding block with a reconstructed portion of an image.

In particular, as shown in FIG. 4, already reconstructed samples 411, 412 of neighboring blocks (such as left and top neighbors in the processing order from left to right and from top to bottom) are used as a template for estimating the intra-mode for the current block. If two adjacent reconstructed coding blocks are available for the current coding block, the template comprises reconstructed samples 411 (referred to in the following as "first template") of a first adjacent reconstructed coding block (e.g. a top template within the top neighbor of the current block) and reconstructed samples 412 (referred to in the following as "second template") of a second adjacent reconstructed coding block (e.g. a left template within the top neighbor of the current block). The first and second template is matched respectively with corresponding portions obtained from a reference line 413, 423 for a plurality of respective candidate intra-modes. The reference line 413, 423 is a line among the reconstructed samples which is parallel to the current block border (i.e. boundary) with the respective (e.g. top or left) neighboring block. This line is extrapolated into different candidate intra-more directions to obtain the respective predictors. The best matching predictor is then found and its intra-mode direction taken for the intra-mode of the current block. An advantage of DIMD is that intra-mode is determined implicitly, without including any control information into the bitstream. A disadvantage of the DIMD is that it required a larger memory for storing the reference line and the already reconstructed samples of the neighboring blocks forming a template in order to be able to perform the template matching. In the existing codecs, a DIMD flag, which is signaled for each coding unit, indicates whether or not DIMD is applied.

Figure 5:
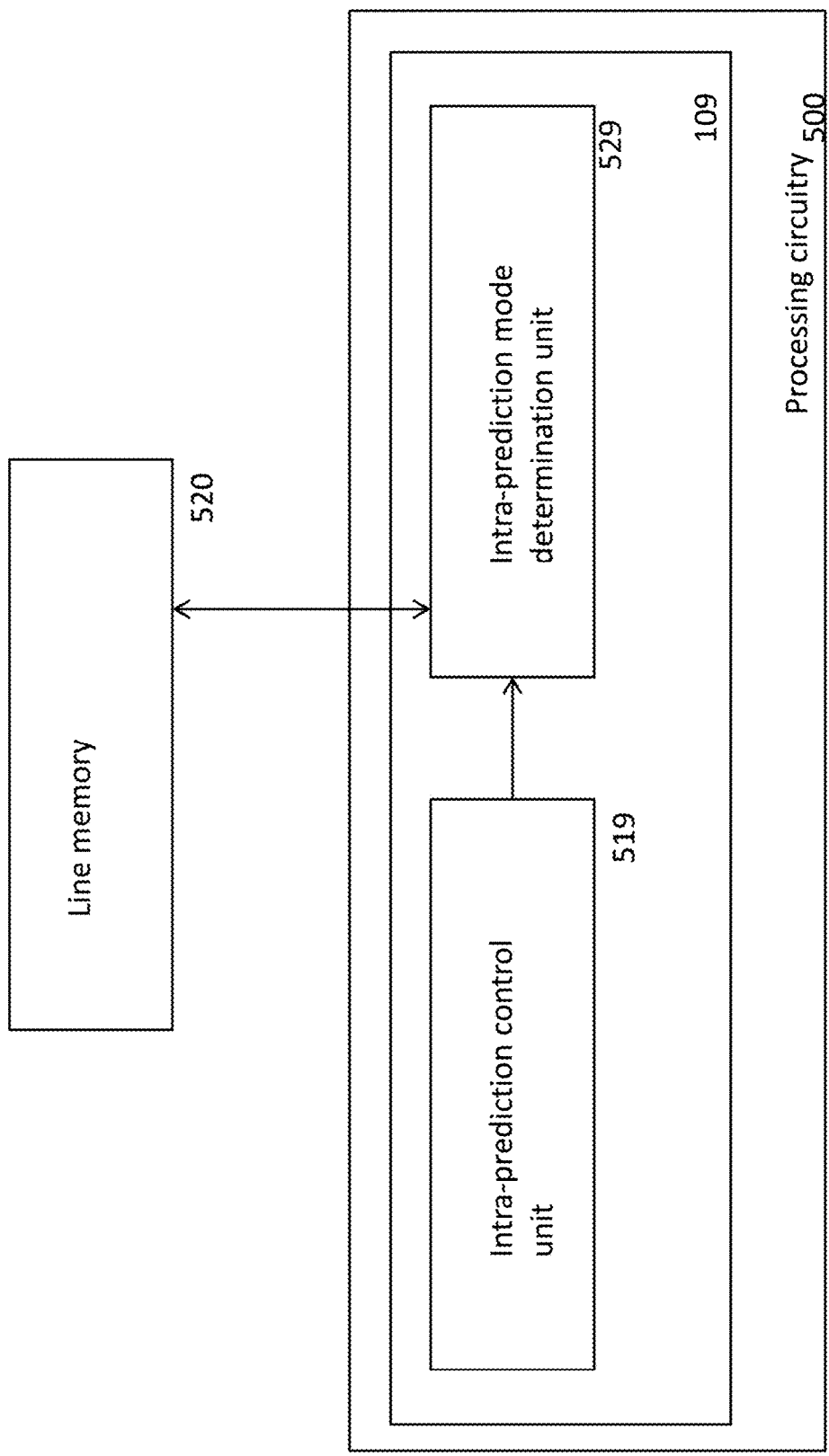
FIG. 5 is a block diagram showing an apparatus for intra-predicting coding blocks of an image.

An apparatus for intra-predicting coding blocks of an image is shown in FIG. 5. The apparatus may be implemented in an intra-prediction unit 109, 209 of a video encoder 100 or video decoder 200.

Generally, the apparatus comprises an intra-prediction mode determination unit 529 and an intra-prediction control unit 519. For example, the intra-prediction mode determination unit 529 and an intra-prediction control unit 519 may be implemented in a single processing circuitry 500. Then, the processing circuitry of the processor, in operation, performs determination of an intra-prediction mode determination and intra-prediction control. The processing circuitry 500 may be part of a single processor or may be implemented as a combination of various hardware, programmable hardware and software.

Figure 6:
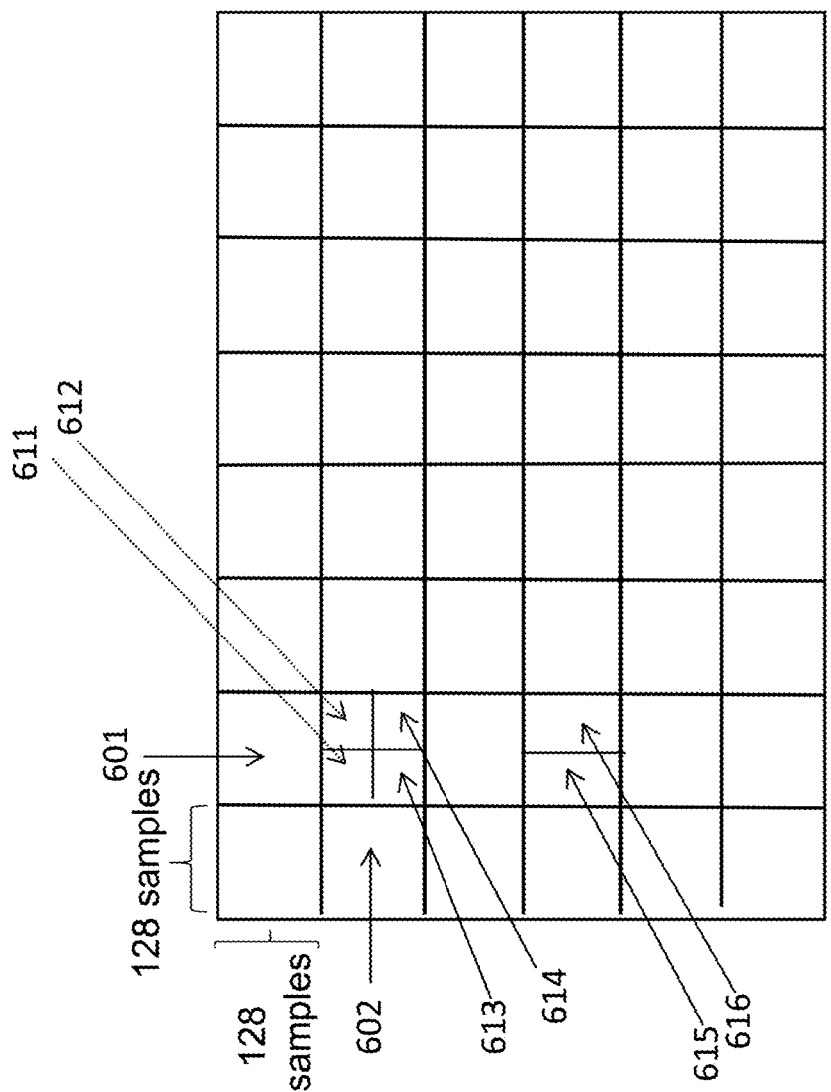
FIG. 6 is a schematic drawing illustrating an exemplary arrangement of coding blocks in an image.

The intra-prediction mode determination unit 529 is configured to determine an intra-prediction mode for a current coding block. An arrangement of coding blocks of an image is shown in FIG. 6.

In particular, the intra-prediction mode determination unit 529 is configured to determine an intra-prediction mode for the current coding block is based on pixels of a first reconstructed coding block 601 and/or a second reconstructed coding block 602. The first reconstructed coding block 601 and the second coding block 602 are adjacent to the current coding block 611 in respectively different directions among a vertical direction and a horizontal direction.

The pixels of the first reconstructed coding block 601 on which the intra-prediction mode determination is based correspond to the pixels of the first template 411 of FIG. 4. Analogously, the pixels of the second reconstructed coding block 602 correspond to the pixels of the second template 412.

Moreover, the term "adjacent" means directly adjacent or directly neighboring. Accordingly, an adjacent coding block is one of a top 601, bottom 613, left 602 or right 612 neighbor of the current coding block 611.

The intra-prediction control unit 519 is configured to deactivate determination of the intra-prediction mode based on the pixels of the first reconstructed coding block 601 if the border between the current coding block and first reconstructed coding block 601 concurs with a border between adjacent coding tree blocks.

In the exemplary arrangement of FIG. 6, two coding blocks 611, 612 are shown that are located in the upper half of a coding tree block. Accordingly, the top border of these coding blocks 611, 612 concurs with a border between the coding tree block which comprises the coding blocks 611, 612 and its top neighboring coding tree block 601. Thus, according to some embodiments of the present disclosure, intra-prediction mode determination is not performed based on the pixels of the adjacent coding tree block 601. For instance, for the coding blocks 611, 612 whose top borders, i.e. the boundaries with the coding blocks adjacent at the top, are aligned with horizontal CTU borders, only the left template is used for intra-prediction mode derivation. Although not shown in FIG. 6, the adjacent first reconstructed coding block may as well be a partitioned coding tree block or a coding block obtained by partitioning a coding tree block.

Deactivating determination of the intra-prediction mode at a border between adjacent coding tree blocks provides the advantage that the number of computations for DIMD (e.g. SAD calculations) is reduced. Moreover, memory access to the samples of the first adjacent coding block is reduced. In particular, if the samples of the first template 411 belong to a coding tree block different from the coding tree block to which the current coding block 611 belongs (the current coding block may also be an unpartitioned coding tree block), these samples may be stored in a line buffer 520 and there could be variance with the memory access cycles to the line buffer. Thus, if access to the samples stored in the external line buffer is reduced, possible processing delay due to the variance with the memory access can be reduced.

In the exemplary arrangement of coding blocks shown in FIG. 6, for the coding blocks 611 and 612, DIMD mode derivation only uses the pixels of the respective second adjacent coding block 610, 611 corresponding to the respective left neighbor. Accordingly, access to the line buffer 520 can be saved, which would otherwise take more time and/or memory cycles than accessing the CTB buffer reserved for the same CTB. For the other coding blocks 613, 614 of the same CTB, samples from both left and top neighboring coding blocks may be used.

For example, the intra-prediction control unit 519 can be configured to deactivate the determination of the intra-prediction mode based on the pixels of the first reconstructed coding block 601 only if the border between the current coding block 611 and first reconstructed coding block 601 concurs with a border between adjacent coding tree blocks. Accordingly, the determination of the intra-prediction mode based on the pixels of the first reconstructed coding block is still performed for coding blocks 613, 614 if the respective first adjacent reconstructed coding block (corresponding to the respective top neighboring coding blocks 611, 612 in FIG. 6) is a partition of the same coding tree clock as the current coding block. As a result, while access to the memory storing samples from a previously (in processing order) reconstructed coding block is reduced, a possibly more precise intra-coding mode using samples from both the first and the second templates can still be performed when memory access to samples of a previously coded reconstructed coding block is not required.

For example, the first reconstructed coding block 601 is adjacent to the current coding block 611 in top direction, and the second reconstructed coding block 602 is adjacent to the current coding block 611 in left direction. Consequently, if the samples of the top neighbor 601 of the current coding block are stored in the line memory, the access to this line memory can be reduced. However, the present disclosure is not limited to the first reconstructed coding block 601 being the top neighbor of the current coding block 611. Alternatively, intra-prediction mode determination may be deactivated based on samples of the left template 412 within the left neighbor and performed based on samples of the top template 411 within the top neighbor. Moreover, if the processing order is from the top to bottom of the image and/or from the right to the left, the first or second reconstructed coding block may correspond to the right neighbor or the bottom neighbor of the current coding block.

Generally, as discussed, determination of the intra-prediction mode for a current coding block 611 based on the first template 411 is deactivated. With regard to the second template 412, there are two exemplary variants a) and b).

a) The intra-prediction mode determination based on the pixels of the first as well as the second reconstructed coding block is deactivated only if the border between the current coding block and first reconstructed coding block concurs with a border between adjacent coding tree blocks.

b) The intra-prediction mode is determined based on the pixels of the second reconstructed coding block when the determination of the intra-prediction mode based on the pixels of the first coding block is deactivated.

In accordance with variant a), the DIMD tool (i.e. the intra-prediction mode determination unit 529) can be disabled for all the coding units whose top borders are aligned with and concur with CTB borders, i.e., borders between coding tree blocks. Accordingly, for these coding units, no DIMD is performed, neither based on the first template 411 nor based on the second template 412. This variant allows for a further reduction of calculations required for DIMD, such as SAD computations. Still, for coding blocks having no CTB border between themselves and the neighbor comprising the first template 411, DIMD can still be performed.

Variant b), on the other hand, may require more calculations for DIMD than variant a), but may enable a more accurate intra-mode derivation.

The present disclosure encompasses but is not limited to the current coding block having a square shape, i.e. the width being equal to the height. Alternatively, the length of the current coding block 611 in one of the horizontal and the vertical directions may be larger than the length of the current coding block in the other one of the horizontal and vertical direction. I.e., the height of the current coding block 611 may be larger than its width, or the width may be larger than its height.

The effects of deactivating DIMD for the samples of the first reconstructed coding block are as follows. If the border between the current coding block 611 and the first adjacent reconstructed coding block 601 is shorter than the border between the current coding block 601 and the second reconstructed coding block, then a high probability of detecting a gradient in the sample values can still be maintained, because a gradient may more likely intersect with the longer border of the current coding block than with the shorter border of the current coding block. For instance, a coding block 615 is shown which has been obtained by partitioning a coding tree block into a left coding block 615 and a right coding block 616. This corresponds to binary-tree partitioning. For each of the respective coding blocks, the left border is longer than the top border concurring with a CTU border, the coding blocks rectangular but not square. Accordingly, the left template, based on which DIMD is performed, is larger (comprising for instance twice the number of samples) than the top template.

For example, the apparatus for intra-predicting coding blocks of an image according to the present disclosure is comprised by an image encoding device, for instance a video encoder 100. The image encoding device further comprises an encoding unit 103 to encode the image and thus generate a bitstream.

As another example, the apparatus for intra-predicting coding blocks of an image is comprised by an image decoding device (e.g. a video decoder 200) which further comprises a decoding unit 203 configured to decode the image from a bitstream.

In a specific example, the encoding unit of the image encoding device is capable of including into the bitstream and indicator indicating whether or not decoder-based intra-prediction mode determination (i.e. intra-mode determination based on template matching) is to be performed for one or more coding blocks. The indicator corresponds to a DIMD flag which is signaled in the bitstream.

However, for some coding blocks, for example coding blocks adjacent to the left border (i.e. boundary) of a picture or slice, the DIMD flag need not be signaled, and signaling overhead can thus be reduced alongside computational complexity. Thus, as an example, the encoding unit of the image encoding device is configured not to include in the bitstream said indicator for the current coding block if the second reconstructed coding block is not available for the current coding block. Furthermore, for instance, the image decoding device is configured to determine that the intra-prediction mode determination is not to be performed for the current coding block if the second reconstructed coding block is not available for the current coding block.

Figure 7:
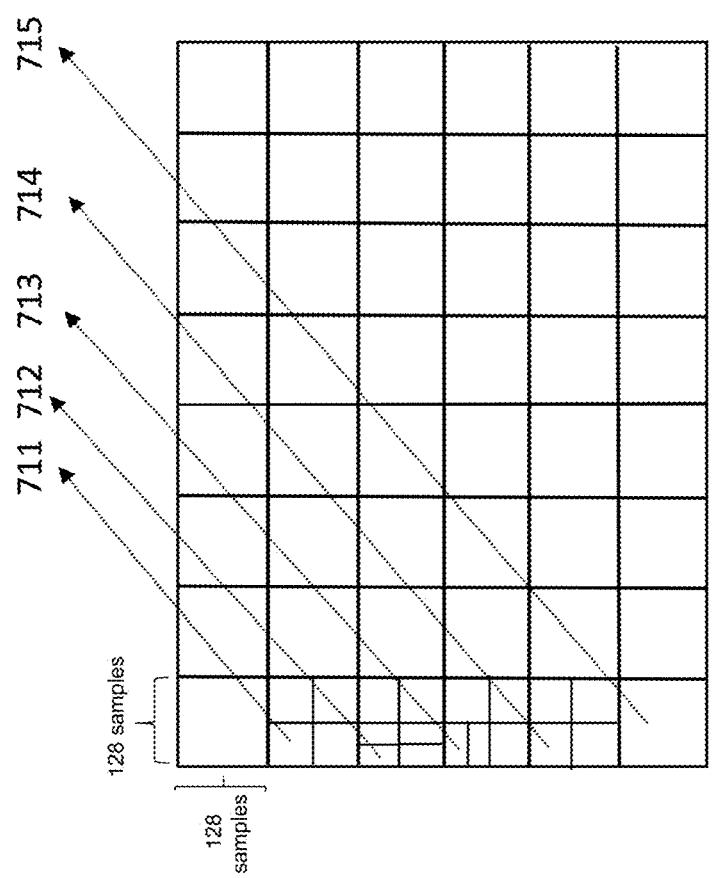
FIG. 7 is a schematic drawing illustrating an exemplary arrangement of coding blocks at a border of an image.

In particular, a current coding block which lies at a picture (or slice) border (i.e. picture/slice boundary) so that no reconstructed neighboring samples are available (e.g. the left image border of the image if the image is processed from left to right) has a reconstructed neighboring coding block available only in one direction corresponding to the first reconstructed coding block 601. For such a coding block at an image/slice border, there is the image border in the direction where the second reconstructed coding block would usually be localized, but no reconstructed samples. Accordingly, if the border between the available reconstructed coding block and the current coding block concurs with a border between coding tree blocks, then DIMD cannot be performed at all. Accordingly, the DIMD flag need not be signaled as its value can be inferred at 0 at the decoder for this current coding block. As a convention, value 0 of the DIMD flag for a coding unit indicates that no DIMD is to be performed for the respective coding unit. On the other hand, a value 1 indicates that DIMD is to be performed. However, alternatively, the flag values may also be reversed such that 1 indicates no DIMD and DIMD to be performed for the respective coding block. In FIG. 7, examples for such coding blocks 711 to 715 lying at the left boundary of the image or slice are shown with a CTB border between these coding blocks 711 to 715 and their respective top neighbors. For these coding blocks, a left neighbor corresponding to the second reconstructed coding block and therefore a left template respectively does not exist, DIMD cannot be performed and the DIMD flag need not be signaled, even when the variant b) disclosed above is used for intra-predicting the coding blocks, DIMD based on the second (left) template is generally activated.

Furthermore, when using above variant a) and disabling DIMD for all coding units whose border with the first reconstructed coding unit (e.g. top borders) concur with CTB borders, the DIMD flag need not be signaled for these coding units. When the flag is not signaled, its value can be inferred to be 0 at the decoder.

For example, the intra prediction mode may be determined based on a cost function. The cost function may output for each of a plurality of candidate intra modes such as shown in FIG. 3A, a similarity measure between pixels of the reference line 413, 423 and each of the L adjacent lines of the template adjacent to the reference line 413, 423. Accordingly, the SAD (which actually measures the dissimilarity) may be calculated respectively between the reference line 413, 423 and each of the L adjacent lines of the template which are parallel to the reference line. The respective SADs for the L adjacent lines 411, 412 then are summed up, and their sum is chosen as the output of the cost function. To cover all of the DIMD candidate modes shown in FIG. 3A, the mode with the minimal cost may be chosen as a result of cost function calculations of a left template 412 of a reconstructed coding block adjacent to the left with a left reference line 423 in a left reconstructed image portion and a top template 411 of a reconstructed coding block adjacent to the top with a reference line 413 in a top reconstructed portion of the image. Alternatively, MSE or SSIM may be used instead of SAD.

It is noted that the similarity is calculated between the reconstructed area (template) formed by the second number of lines, L, each line with a length G (corresponding for instance to the CU size or smaller) and a predicted area predicted from the reference line. In particular, the predicted area includes the second number of lines—each of the lines corresponding to a portion of the reference line with the length G. The L lines of the predicted area are obtained by directional interpolation, in the same way as intra-prediction in the corresponding direction is performed. For instance, shifted parts of G pixels from the reference line are copied, the shift depending on the angular direction of the tested (matched) intra-mode.

As discussed, in addition to the template of samples of a reconstructed coding block, DIMD is further based on the reference line 413, 423 which is matched with the pixel lines of the template. Dependent on the respective candidate intra-mode direction which is tested, some pixels of the reference line used for this matching are not in the reconstructed coded block which is adjacent to the current coding block (for instance the three leftmost samples of the top reference row in FIG. 3B). These samples then may belong to coding blocks adjacent to the reconstructed coding block in the direction of the reference line. For example, if the first template 411 corresponds to the top template 411 of samples of the top neighbor 601 of the current coding block 611, the reference line may include samples of a reconstructed coding block adjacent to the left or to the right of the top neighbor.

However, these pixels not included by the first reconstructed coding block may be pixels of an unavailable coding block. In particular, the respective neighbor of the first reconstructed coding block may not be available if the current coding block and the first reconstructed coding block are adjacent to an image/slice border of the and the respective candidate intra-mode is at a sharp angle with the border. Accordingly, if pixels of such an unavailable coding block are used for an intra-mode, they may be obtained by means of reference sample substitution. In particular, "fake" or artificial reference samples such as padded samples or extrapolated samples may be taken as samples of the reference line if actual reconstructed image samples (e.g. samples of the coding blocks to the top right or the bottom left of the current coding block) are not available. Therefore, some of the angular modes which use these fake reference samples lead to an improper angular mode derivation for the target coding block as artifacts resulting from the fake reference samples may affect the result of DIMD.

Therefore, the set of candidate intra-modes tested may be reduced by "dis-allowing" some improper angular modes. Accordingly, for example, the intra prediction control unit is further configured to disable an intra-prediction mode which uses a pixel of an unavailable coding block. Therein, the pixel of the unavailable coding block is matched, i.e. its similarity is determined, with pixels of the template along the direction of the respective intra-mode. For instance, intra mode 66 (see FIG. 3A) can be disallowed when the top right block is not allowed because then it uses mostly fake reference samples to generate the prediction samples. Thereby, the number of candidate intra modes tested to derive the intra mode for the current target block is reduced. Thus, computational complexity is reduced.

Figure 8:
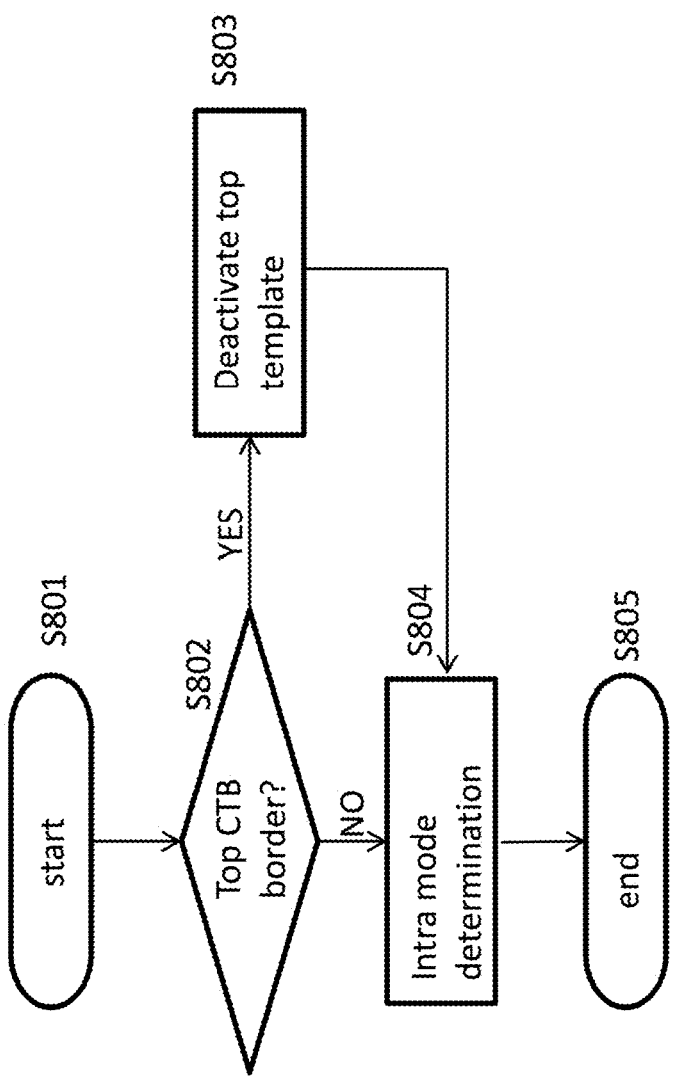
FIG. 8 is a flow chart of a method for intra-predicting coding blocks of an image.

A flow chart of a method for intra-predicting coding blocks is shown in FIG. 8. After the intra-prediction starts S801 for a current coding block, a, a test S802 is performed whether or not the border between the current coding block and a first reconstructed coding block concurs with a border between coding tree blocks. In the example of the figure, this border is the top border of the current coding block. However, dependent on the processing direction, the first reconstructed coding block may also correspond to the coding block adjacent at the left border to the current coding block. If the border between the current coding block and the first reconstructed coding block concurs with a border between coding tree blocks, determination of the intra-prediction mode (DIMD) based on pixels of the first reconstructed coding block (e.g. the top template) is deactivated S803. After deactivation of DIMD based on the top template S803, the method proceeds to the step of determining the intra-prediction mode S804. In this case, DIMD is performed based on pixels of a second reconstructed coding block, if it is available. The first and the second coding block are adjacent to the current coding block in respectively different directions among a vertical direction and a horizontal direction. Accordingly, the pixels of the second reconstructed coding block may correspond to the left template. If the border between the current coding block and the first reconstructed coding block does not concur with a border between coding tree clocks, the method proceeds from step S802 to step 804 of determining the intra-mode, which then is preformed based on the first and the second template. After determination of the intra-prediction mode S804, the method ends S805.

Test results for a for intra-mode derivation according to the present disclosure are shown in FIGS. 9 to 11. While computational complexity is reduced, no coding loss is observed compared to the original DIMD proposal.

The present disclosure is not limited to the examples shown above. For instance, the figures and the description exemplified using as a template the pixels of the left and the top template. This is because it was assumed that the decoding order goes from left to right and from top to bottom so that only the samples of the top and the left neighbors are available (reconstructed). However, the disclosure is also applicable to any other decoding order and the corresponding available neighboring blocks.

The present disclosure may be implemented in an apparatus. Such apparatus may be a combination of a software and hardware. For example, the intra-prediction and deblocking filtering may be performed by a chip such as a general purpose processor, or a digital signal processor (DSP), or a field programmable gate array (FPGA), or the like. However, the present disclosure is not limited to implementation on a programmable hardware. It may be implemented on an application-specific integrated circuit (ASIC) or by a combination of the above mentioned hardware components.

The intra-prediction and deblocking filtering determination may also be implemented by program instructions stored on a computer readable medium which when executed by a computed perform the steps of a method as described above. The computer readable medium can be any medium on which the program is stored such as a DVD, CD, USB (flash) drive, hard disc, server storage available via a network, etc.

The encoder and/or decoder may be implemented in various devices including a TV set, set top box, PC, tablet, smartphone, or the like. It may be a software, app implementing the method steps.

Summarizing, embodiments of the present disclosure relate to image encoding/decoding applying decoder side intra-prediction mode determination (DIMD). In order to reduce the computational complexity, DIMD for a current coding block based on a template of a neighboring reconstructed coding block is not performed if the border between the current and the reconstructed coding block concurs with a border between coding tree blocks.

What is claimed is:

1. An apparatus for intra-predicting coding blocks of an image comprising a processing circuitry configured to:
  determine an intra-prediction mode for a current coding block based on pixels of at least one of a first reconstructed coding block and a second reconstructed coding block, the first reconstructed coding block and the second reconstructed coding block being adjacent to the current coding block in respectively different directions among a vertical direction and a horizontal direction;

match pixels of the first reconstructed coding block with a template along a direction of the intra-prediction mode;

determine whether a border between the current coding block and the first reconstructed coding block concurs with a border between adjacent coding tree blocks; and deactivate determination of the intra-prediction mode based on the pixels of the first reconstructed coding block when the border between the current coding block and the first reconstructed coding block concurs with the border between the adjacent coding tree blocks, wherein the current coding block and the first reconstructed coding block belong to a same slice.

2. The apparatus according to claim 1, wherein the processing circuitry is configured to deactivate the determination of the intra-prediction mode based on the pixels of the first reconstructed coding block, only if the border between the current coding block and the first reconstructed coding block concurs with the border between adjacent coding tree blocks.

3. The apparatus according to claim 1, wherein the first reconstructed coding block is adjacent to the current coding block in top direction, and the second reconstructed coding block is adjacent to the current coding block in left direction.

4. The apparatus according to claim 1, wherein the processing circuitry is configured to deactivate determination of the intra-prediction mode based on the pixels of the first as well as the second reconstructed coding block only if the border between the current coding block and the first reconstructed coding block concurs with the border between adjacent coding tree blocks.

5. The apparatus according to claim 1, wherein the processing circuitry is configured to determine the intra-prediction mode for the current coding block based on the pixels of the second reconstructed coding block when the determination of the intra-prediction mode based on the pixels of the first coding block is deactivated.

6. The apparatus according to claim 1, wherein the length of the current coding block in one of the horizontal and vertical directions is larger than the length of the current coding block in the other one of the horizontal and vertical direction.

7. The apparatus according to claim 1, wherein the processing circuitry is further configured to disable an intra-prediction mode which uses a pixel of an unavailable coding block.

8. The apparatus according to claim 1 further comprising:
an encoding unit configured to encode the image to generate a bitstream.

9. The apparatus according to claim 8, wherein the encoding unit is capable of including into the bitstream an indicator indicating whether or not intra-prediction mode determination is to be performed for one or more coding blocks but configured not to include, in the bitstream, said indicator for the current coding block if the second reconstructed coding block is not available for the current coding block.

10. The apparatus according to claim 1 further comprising a decoding unit configured to decode the image from a bitstream.

11. The apparatus according to claim 10, wherein the decoding unit is further configured to determine that intra-prediction mode determination is not to be performed for the current coding block if the second reconstructed coding block is not available for the current coding block.

12. A method for intra-predicting coding blocks of an image comprising the steps of:

determining an intra-prediction mode for a current coding block based on pixels of at least one of a first reconstructed coding block and a second reconstructed coding block, the first reconstructed coding block and the second reconstructed coding block being adjacent to the current coding block in respectively different directions among a vertical direction and a horizontal direction;

matching pixels of the first reconstructed coding block with a template along a direction of the intra-prediction mode;

determining whether a border between the current coding block and the first reconstructed coding block concurs with a border between adjacent coding tree blocks; and deactivating determination of the intra-prediction mode based on the pixels of the first reconstructed coding block when the border between the current coding block and the first reconstructed coding block concurs with the border between the adjacent coding tree blocks, wherein the current coding block and the first reconstructed coding block belong to a same slice.

13. The method of claim 12 further comprising:
encoding the image to generate a bitstream.

14. The method of claim 12 further comprising
decoding an image from a bitstream.

15. A non-transitory computer readable medium storing program instructions which, when executed, cause a computer to perform a method for intra-predicting coding blocks of an image comprising the steps of:

determining an intra-prediction mode for a current coding block based on pixels of at least one of a first reconstructed coding block and a second reconstructed coding block, the first reconstructed coding block and the second reconstructed coding block being adjacent to the current coding block in respectively different directions among a vertical direction and a horizontal direction;

matching pixels of the first reconstructed coding block with a template along a direction of the intra-prediction mode;

determining whether a border between the current coding block and the first reconstructed coding block concurs with a border between adjacent coding tree blocks; and deactivating determination of the intra-prediction mode based on the pixels of the first reconstructed coding block when the border between the current coding block and the first reconstructed coding block concurs with the border between the adjacent coding tree blocks, wherein the current coding block and the first reconstructed coding block belong to a same slice.

* * * * *